US011681353B1

(12) United States Patent
Bower, III et al.

(10) Patent No.: US 11,681,353 B1
(45) Date of Patent: Jun. 20, 2023

(54) POWER CAPPING IN A COMPOSABLE COMPUTING SYSTEM

(71) Applicant: Lenovo Global Technology (United States) Inc., Morrisville, NC (US)

(72) Inventors: Fred Allison Bower, III, Durham, NC (US); Caihong Zhang, Shanghai (CN); Ming Lei, Shanghai (CN); Jiang Chen, Shanghai (CN); Jonathan Hinkle, Raleigh, NC (US)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 0 days.

(21) Appl. No.: 17/706,069

(22) Filed: Mar. 28, 2022

(51) Int. Cl.
   *G06F 1/32*      (2019.01)
   *G06F 1/3287*   (2019.01)

(52) U.S. Cl.
   CPC .................................. *G06F 1/3287* (2013.01)

(58) Field of Classification Search
   CPC .................................................... G06F 1/3287
   See application file for complete search history.

(56) References Cited

U.S. PATENT DOCUMENTS

| 2008/0301479 | A1* | 12/2008 | Wood | G06F 1/3203 |
| | | | | 713/322 |
| 2010/0211958 | A1* | 8/2010 | Madison, Jr. | G06F 9/5083 |
| | | | | 718/1 |
| 2019/0094926 | A1* | 3/2019 | Subramanian | G06F 1/324 |

\* cited by examiner

*Primary Examiner* — Stefan Stoynov
(74) *Attorney, Agent, or Firm* — Jeffrey L. Streets; Streets Lawfirm, P.C.

(57) ABSTRACT

A computer program product provides program instructions that are executable by a processor to cause the processor to perform various operations. The operations may include monitoring a performance metric for a workload instance being executed by a composed system within a pool of composable resources in a composable computing system. The composed system includes a compute resource and an associated hardware resource selected from a data storage resource, a memory resource and/or a graphic processing resource. A service level agreement is identified for the workload instance, wherein the agreement includes a minimum level of the performance metric that the composed system must provide to support the workload instance. A power cap may be imposed on the compute resource, and a power cap may be imposed on the associated hardware resource by sending a power capping command to a baseboard management controller on a server including the associated hardware resource.

20 Claims, 4 Drawing Sheets

POWER CAPPING IN A COMPOSABLE COMPUTING SYSTEM

BACKGROUND

The present disclosure relates to the control of hardware resources in a composable computing system.

Background of the Related Art

A power cap may be applied to a computing system running an operating system or hypervisor such that the operating system or hypervisor can implement the power cap since all of the system resources are being supplied power from the same power domain as the central processing units (CPUs) that are running the operating system. However, in a composable computing system, the system resources allocated to a composed system are disaggregated and may be receiving power from various different power domains. The shared hardware resources within a single composed system are physically located elsewhere with a different power source and independent power control. In such configurations, there is no existing provision to communicate to a remotely-shared resource that a power capping or throttling event has occurred on the compute resource operating system. Accordingly, the remotely-shared resource may continue to run at full power even when the demand on that remotely-shared resource has been scaled to a lower level and power saving opportunities may exist.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may include monitoring a level of a performance metric for a workload instance being executed by a composed system within a pool of composable resources in a composable computing system, wherein the composed system includes a compute resource and an associated hardware resource selected from a data storage resource, a memory resource and/or a graphic processing resource. The operations may further include identifying a service level agreement for the workload instance, wherein the service level agreement includes a minimum level of the performance metric that the composed system must provide to support the workload instance, imposing a compute resource power cap on the compute resource, and imposing an associated hardware resource power cap on the associated hardware resource by sending a power capping command to a baseboard management controller on a server including the associated hardware resource.

Some embodiments provide a computer program product comprising a non-volatile computer readable medium and non-transitory program instructions embodied therein, the program instructions being configured to be executable by a processor to cause the processor to perform various operations. The operations may include monitoring a level of a performance metric for a workload instance being executed by a composed system within a pool of composable resources in a composable computing system, wherein the composed system includes a compute resource and a plurality of associated hardware resources selected from a data storage resource, a memory resource and/or a graphic processing resource. The operations may further include identifying a service level agreement for the workload instance, wherein the service level agreement includes a minimum level of the performance metric that the composed system must provide to support the workload instance, imposing a compute resource power cap on the compute resource, and imposing, for each of the plurality of associated hardware resources, an associated hardware resource power cap on the associated hardware resource by sending a power capping command to a baseboard management controller on a server including the associated hardware resource.

DETAILED DESCRIPTION

Some embodiments provide a computer program product comprising a non-volatile computer readable medium and non-transitory program instructions embodied therein, the program instructions being configured to be executable by a processor to cause the processor to perform various operations. The operations may include monitoring a level of a performance metric for a workload instance being executed by a composed system within a pool of composable resources in a composable computing system, wherein the composed system includes a compute resource and an associated hardware resource selected from a data storage resource, a memory resource and/or a graphic processing resource. The operations may further include identifying a service level agreement for the workload instance, wherein the service level agreement includes a minimum level of the performance metric that the composed system must provide to support the workload instance, imposing a compute resource power cap on the compute resource, and imposing an associated hardware resource power cap on the associated hardware resource by sending a power capping command to a baseboard management controller on a server including the associated hardware resource.

A composable computer system, also referred to as composable infrastructure, treats compute devices, storage devices, memory devices and network devices as separate pools of resources that can be provisioned to composed system as needed, depending on the capacity and performance requirements of a given workload to be performed by the composed system. The composable computer system decouples various resources, such as compute, memory, storage, graphics processing and networking resources, from their hardware to make them accessible by any device in a data center. For the most part, the resources are disaggregated, which means that a single device may not contain all types of resources. Rather, each device may be dedicated to a specific resource type. For example, a storage server may include data storage resources, but typically no more computing resources, memory resources, etc. than to support data in and out of the data storage resources. Similarly, a memory server may include memory resources, but typically no more computing resources, data storage resources, graphics processing resources, etc. than to support data in and out of the memory resources. Still further, a graphics processing server may include graphics processing resources, but typically no more computing resources, data storage resources, memory resources, etc. than to support data in and out of the graphics processing resources. Other resources may be similarly made available in the composable computer system.

A composed system may be temporarily formed within the pool of composable resources in the composable computing system. For example, one possible composed system may include a compute resource and an associated hardware resource selected from a data storage resource, a memory resource and/or a graphic processing resource, without limitation. A first composed system for performing a first workload with a high computational workload may require substantial compute resources, such as processors, while requiring only minimum data storage resources. Conversely, a second composed system for performing a second workload may generate lots of data, therefore requiring a vast amount of data storage resources and relatively little compute resources. Accordingly, a composer application having knowledge of the hardware capacity requirements of a particular workload may compose a system that includes a sufficient amount of each resource to perform the particular workload. The required compute, memory, storage and/or network resources are selected from available resource pools, and the particular workload may then be performed on the composed system. When the selected resources of the composed system have completed the particular workload, the selected resources may be returned to the resource pool for subsequent allocation to another composed system for performing another workload.

A workload instance may be any program or application that is performed on a compute node, such as a composed system including a set of disaggregated computing hardware resources. The tasks involved in preforming a workload instance may vary widely depending on the complexity and intended purpose of the workload instance. A workload instance may be submitted by a client device in the form of a workload request transmitted over a network from the client device to a composer, such as a management server running an application that manages the composable computing system.

In some embodiments, a workload instance may have a Service Level Agreement (SLA) that defines a minimum level of performance that the hardware resources of the composed system must provide to support the workload instance. For example, the service level agreement may include a minimum level of one or more performance metric, such as latency, availability and/or throughput associated with the workload instance. The central processing unit (CPU) of the composed system may monitor the workload metrics across all resources of the composed system and may determine whether the service level agreement is being satisfied. While the various operations are preferably performed by the central processing unit of the composed system, the operations could also be performed by a composer, such as a management server or other composable system manager. For example, the composer may manage multiple composed systems at the orchestrator level and may dynamically adjust the power caps and/or states of any one or more of the associated resources on behalf of the composed system.

A power cap on a hardware resource is an amount of power that is allocated to the hardware resource and limits the hardware resource from exceeding the allocated amount of power. A power cap may be useful in power management of a computing system, especially in an oversubscribed computing system. Imposing a power cap on a first composed system may free up power that can be allocated to another composed system. The power cap may be an amount of power or a particular power state. In some embodiments, power capping of one or more resource enables a greater level of oversubscription in the composable computing system.

Some embodiments may include incrementally reducing the associated hardware resource power cap on the associated hardware resource of a composed system in response to the monitored level of the performance metric being greater than a setpoint amount above the minimum level of the performance metric established by the service level agreement for the workload instance. In other words, an amount of power allocated to the associated hardware resource under the power cap may be reduced if the composed system is currently performing the workload instance at a performance metric level that is more than the setpoint amount of the minimum level for the workload instance. Furthermore, embodiments may include incrementally increasing the associated hardware resource power cap on the associated hardware resource in response to the monitored level of the performance metric being less than the minimum level of the performance metric established by the service level agreement for the workload instance. While the performance metric for the workload instance preferably does not become less than the minimum level specified by the service level agreement for the workload instance, it is possible that a sudden change in conditions may result in a brief drop in the performance metric. Accordingly, the associated hardware resource power cap on the associated hardware resource may be increased to alleviate the situation. The process of incrementally changing (increasing or decreasing) a power cap and/or power state of an associated resource while verifying that the service level agreement for the workload instance is being satisfied may be referred to as 'adaptive power capping." For example, the central processing unit of a composed system may dynamically adjust the power cap and/or power state of any one or more of the associated hardware resources that are included in the composed system based upon the needs of the workload instance during performance of the workload instance.

Adaptive power capping may enable communication of power capping events in a composed system to achieve power efficiency. Accordingly, a power cap for a memory resource, storage resource, and graphics processing resource of a composed system may be adjusted gradually to achieve a minimum power consumption value while monitoring the workload instance to verify that the composed system is meeting the performance requirements of the service level agreement associated with the workload instance. Over one or more iterations, a power cap may be determined that reduces or minimizes the amount of power allocated to the associated hardware resource yet still allows the workload instance to be performed consistent with the service level agreement, such as by capping the memory resource at a first power value, capping the storage resource at a second power value, and capping the graphics processing resource at a third power value.

Some embodiments may include incrementally reducing the associated hardware resource power cap on the associated hardware resource until the monitored level of the performance metric is less than a setpoint amount above the minimum level of the performance metric established by the service level agreement for the workload instance. While the minimum level of the performance metric may be established by the service level agreement for the workload instance, the setpoint amount may be established by an administrator of the composable computing system. In one option, the associated hardware resource power cap may be incrementally reduced by a fixed amount of power. In another option, the operation of incrementally reducing the associated hardware resource power cap on the associated hardware resource includes sending a further associated hardware resource power capping command to the baseboard management controller of the associated hardware resource. Some embodiments may include incrementally increasing the associated hardware resource power cap on the associated hardware resource until the monitored level of the performance metric is greater than the minimum level of the performance metric established by the service level agreement for the workload instance.

Some embodiments provide for a central processing unit (compute resource) in a composed system to implement power capping of the associated hardware resources of the composed system. The message or command that the central processing unit will send to the various remotely-shared resources of the composed system to implement an incremental change in the power cap and/or state of the associated resources may be various types and/or in various formats. For example, the message may be directed to various interfaces as may be available or supported by a baseband management controller (BMC) of a server supporting the particular resource, such as Intelligent Platform Management Interface (IPMI) command, Common Interface Model (CIM) command or REDFISH (a registered trademark of Distributed Management Task Force, Inc.) interface. The central processing unit may send the power cap message or command to a baseband management controller on a server providing the particular resource and the baseboard management controller may enforce the power cap on the resource. The power cap message may include a power cap amount, such as a numerical amount in units of Watts. In one option, the power capping command is an Intelligent Platform Management Interface command and the power capping message is sent to the baseboard management controller of the associated hardware resource via an Intelligent Platform Management Interface. In another option, the power capping command is a Common Information Model command.

In some embodiments, the composed system or the composable computing system manager may reduce the power consumption of the composed system by releasing a portion of the capacity of one or more of the resources of the composed system rather than imposing a power cap on the one or more resources or reducing an existing power cap on the one or more resources. By releasing some portion of the capacity of the resource, the amount of power consumed by the remaining portion of the capacity of the resource to perform a workload instance will be effectively reduced. However, orchestration policies would need to comprehend the idea of a temporary release of a portion of capacity of a resource in order to enable return of the resource capacity to the original composed system after the power cap event clears and the resource state is expected to return to a pre-cap state.

Some embodiments may include identifying an excess capacity of the associated hardware resource that is temporarily unusable under the associated hardware resource power cap imposed on the associated hardware resource, and temporarily releasing the identified excess capacity of the associated hardware resource from the composed system back to the composable computing system resource pool. In one option, the operations may further include determining that the associated hardware resource power cap on the associated hardware resource of the composed node has been eliminated or increased, and requesting return of the temporarily released excess capacity of the associated hardware resource to the composed system. The hardware resource may be released to the composer and the request for return may be directed to the composer.

In some embodiments, a level of a power cap for an associated resource of a composed system may be determined using a machine learning algorithm, such as a Reinforcement Learning (RL) algorithm. Reinforcement Learning (RL) employs a system of rewards and penalties to compel the computer to solve a problem by itself. Reinforcement Learning algorithm Q-Learning is applied to analyze State and Reward to predict the next Action. The environment is the composed system which interacts with the Reinforcement Learning algorithm, reports metrics and accepts actions. The state space is a function of the environment situations, such as the target service level agreement and the metrics of the workload. The actions may include the power capping value for the associated resource. The reward may be power efficiency while maintaining the target service level agreement for the workload. The Q-value may be a function of the state value and accumulated rewards. The rewards (power efficiency) and state (target service level agreement and current workload metrics) of the composed system in a given time interval may be input to the Reinforcement Learning algorithm and the output of the Reinforcement Learning algorithm may be an action (power capping value) that in turn affects the reward and state in the next time period. Over numerous iterations, the Reinforcement Learning algorithm learns how to best adjust a power cap to achieve power efficiency while maintaining the workload metrics in compliance with the target service level agreement. The workload metrics of the compute node and the resource nodes may include, without limitation, mean CPU usage rate, canonical memory usage, assigned memory usage, unmapped page cache memory usage, total page cache memory usage, and/or maximum memory usage.

In one option, a workload benchmark application may be run to train the Reinforcement Learning model for power capping of composed systems. For example, such a training process may include: (1) running the workload benchmark application on a composed system, (2) adjusting a target service level agreement of the workload step and step, (3) collect workload target service level agreement and workload metrics as it runs on the composed system, (4) selecting one group of possible power capping values based on current metrics and Q values, and set the selected group of power capping values on the compute resource and its associated hardware resource nodes, (5) updating Q values with the action reward after power capping, and (6) repeat steps or operations 3 through 5 until a training counter (iterations or time) runs out.

In another option, workload instances may run on a composed system using the previously trained Reinforcement Learning model to manage workload power capping of the compute resource node and its associated hardware resource nodes. For example, the trained Reinforcement Learning model may perform a process including: (1) running a Reinforcement Learning based workload power capping agent on the composed system, (2) a new workload arrives to be performed on the compute resource or node, (3) sampling of the target service level agreement of the incoming workload and workload metrics on the compute resource, and using the trained model to find the optimized power capping values of the compute resource node and its associated hardware resource nodes, (4) setting power capping values on the compute resource node and its associated hardware resource node(s) as recommended, (5) updating Q values with the action reward after power capping, and (6) repeating step 3 through 5 until exiting the process, such as when the workload instance has completed.

Some embodiments provide a computer program product comprising a non-volatile computer readable medium and non-transitory program instructions embodied therein, the program instructions being configured to be executable by a processor to cause the processor to perform various operations. The operations may include monitoring a level of a performance metric for a workload instance being executed by a composed system within a pool of composable resources in a composable computing system, wherein the composed system includes a compute resource and a plurality of associated hardware resources selected from a data storage resource, a memory resource and/or a graphic processing resource. The operations may further include identifying a service level agreement for the workload instance, wherein the service level agreement includes a minimum level of the performance metric that the composed system must provide to support the workload instance, imposing a compute resource power cap on the compute resource, and imposing, for each of the plurality of associated hardware resources, an associated hardware resource power cap on the associated hardware resource by sending a power capping command to a baseboard management controller on a server including the associated hardware resource.

In some embodiments, the operations may further include incrementally reducing, for each of the plurality of associated hardware resources, the associated hardware resource power cap on the associated hardware resource in response to the monitored level of the performance metric being greater than a setpoint amount above the minimum level of the performance metric established by the service level agreement for the workload instance.

In some embodiments, the operations may further include incrementally reducing, for each of the plurality of associated hardware resources, the associated hardware resource power cap on the associated hardware resource until the monitored level of the performance metric is less than a setpoint amount above the minimum level of the performance metric established by the service level agreement for the workload instance. In one option, the associated hardware resource power cap on a first one of the plurality of associated hardware resources is incrementally reduced until the monitored level of the performance metric is less than a setpoint amount above the minimum level of the performance metric established by the service level agreement for the workload instance prior to incrementally reducing the associated hardware resource power cap on a second one of the plurality of associated hardware resources until the monitored level of the performance metric is less than a setpoint amount above the minimum level of the performance metric established by the service level agreement for the workload instance. In a separate option, the operations may further include incrementally increasing, for each of the plurality of associated hardware resources, the associated hardware resource power cap on the associated hardware resource until the monitored level of the performance metric is greater than the minimum level of the performance metric established by the service level agreement for the workload instance.

It should be appreciated that any embodiment of a composed system having a plurality of associated hardware resources may include any of the operations described herein in reference to an embodiment of a composed system having even a single associated hardware resource. Furthermore, the operations of any of the foregoing computer program products may implemented as steps of a computer-implemented method. Still further, the operations of any of the foregoing computer program products may implemented in an apparatus or system that performs the operations of the computer program products.

Figure 1:
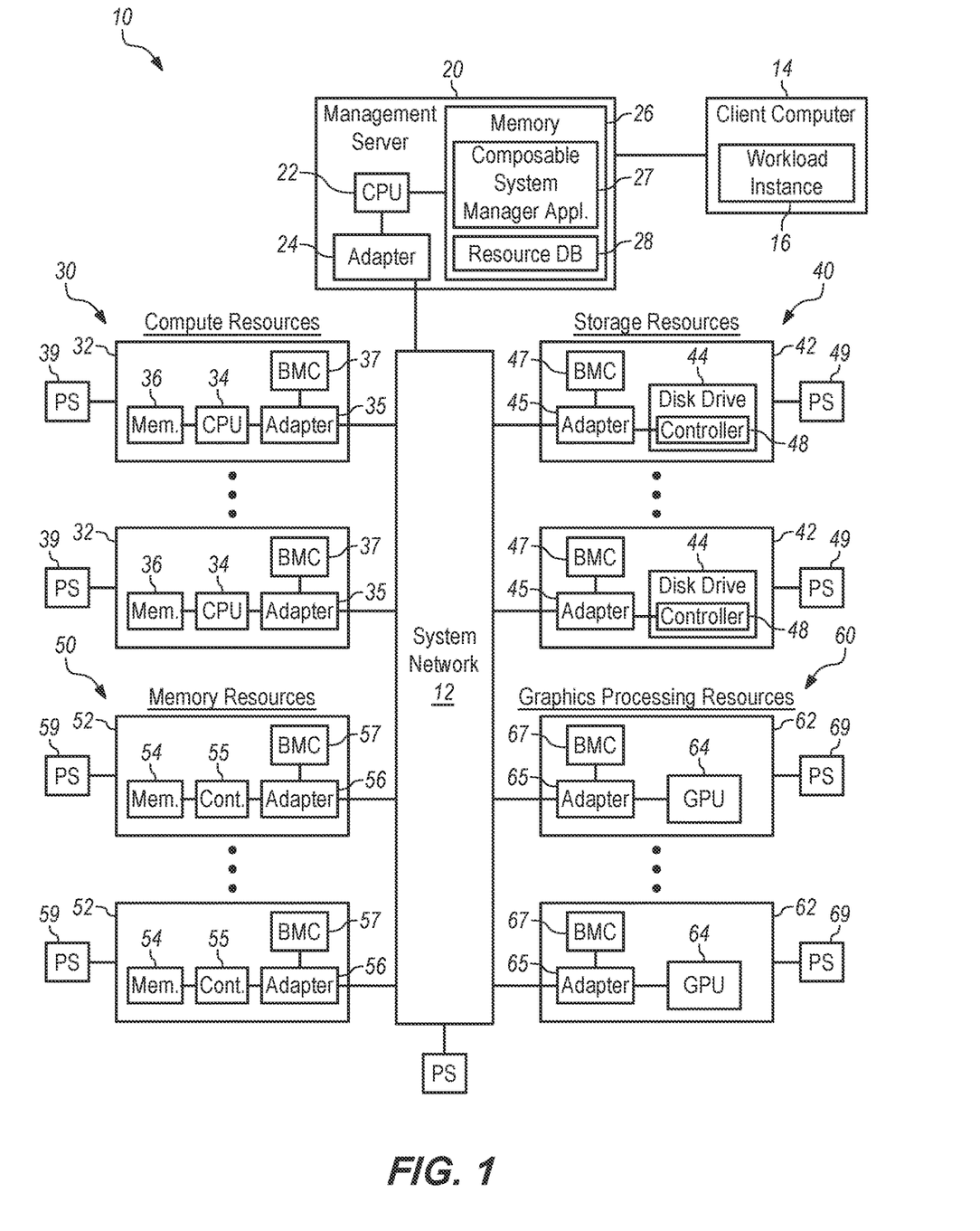
FIG. 1 is a diagram illustrating the general architecture of a composable computing system.

FIG. 1 is a diagram illustrating the general architecture of a composable computing system 10 including a management server 20 that serve as a composer according to some embodiments. The composable computer system 10 also includes various disaggregated computing hardware resources, including compute resources 30, storage resources 40, memory resources 50, and graphics processing resources 60. For example, the management server or composer 22 may include a central processing unit or processor 22, a network adapter 24 to facilitate communication over the system network 12, and memory 26. The memory 26 may store a composable computing system manager application 27 that includes program instructions that, when executed by the processor 22, cause the processor to perform various operations that implement one or more embodiments described herein. The memory 26 may further store or otherwise access a hardware resource database 28 that stores data corresponding to hardware characteristics for each of the other resources in the composable computing system 10.

In the non-limiting illustration of FIG. 1, the compute resources 30 include a number of compute nodes or servers 32 (Server 1 to Server N), each server 32 including at least one processor 34, a network adapter 35 to facilitate communication over the system network 12, some amount of memory 36, and a baseboard management controller 37. For example, the memory 36 may provide a boot image, an operating system, or other applications that support operation of the processor 34. The storage resources 40 may include a number of storage nodes or servers 42, each storage server 42 including, without limitation, a plurality of disk drives 44, a network adapter 45, and a baseboard management controller 47. Each disk drive 44 may include its own controller 48. The memory resources 50 may include a number of memory nodes or servers 52, each memory server 52 including a plurality of volatile and/or non-volatile memory devices 54, a memory controller 55, a network adapter 56, and a baseboard management controller 57. The graphics processing resources 60 may include a number of graphics processing nodes or servers 62, each graphics processing server 62 including, without limitation, a plurality of graphics processing units 64, a network adapter 65, and a baseboard management controller 67.

In some embodiments, the composer 20 may access the system hardware resource database 28, where the system hardware resource database 28 includes, for each unit (i.e., CPUs 34, disk drives 44, memory device 54, and graphics processing unit 64) of the plurality of disaggregated computing hardware resources 30, 40, 50, 60 within a composable computing system 10, data corresponding to hardware characteristics that describe the disaggregated computing hardware resource.

Each server 32, 42, 52, 62 is shown connected to a separate power domain or separate unit of a power supply 39, 49, 59, 69. The exact hardware or nature of each power domain or power supply may optionally be identified in the hardware resource database 28. It is not necessary for each server to have a separate power supply or for an entire server to be supplied from a single power supply. However, FIG. 1 illustrates that composable hardware resources 30, 40, 50, 60 may obtain power from various power supplies throughout the system 10.

A client computer 14 may submit a workload instance 16 to the management server 20. The management server 20 may then use the composable computing system manager application 27 and the hardware resource data base 28 to compose a computer (i.e., a composed system) with sufficient resources to perform the workload instance 16. For example, composable computing system manager application 27 may identify available hardware resources using the hardware resource database 28, select a combination of hardware resource types for performing the workload instance 16, then assign those hardware resources to a composed system. Depending upon the hardware resource requirements of the workload instance, the composed system may include be provisioned to include one or more processor 34 on one or more compute server 32, one or more disk drive 44 on one or more storage server 42, one or more memory device 54 on one or more memory server 52, and/or one or more graphics processing unit 64 on one or more graphics processing server 62. Such a composed system includes hardware resources 34, 44, 54, 64, for example, that receive power from different power supplies 39, 49, 59, 69. Accordingly, power capping of the hardware resources is more complicated than with a traditional server where all of the hardware necessary to support performance of a workload instance are included in a single housing and powered by the same power supply.

In one example, the processor or CPU 34 of the composed system may impose a compute resource power cap on the compute resource or CPU 34 and may also impose an associated hardware resource power cap on one or more associated hardware resource 44, 54, 64 of the composed system by sending a power capping command to a baseboard management controller 47, 57, 67 on the server 42, 52, 62 that includes the associated hardware resource. Accordingly, the baseboard management controller 47, 57, 67 may enforce the power cap on the associated hardware resource. The power cap message may include a power cap amount, such as a numerical amount in units of Watts. In one option, the power capping command is an Intelligent Platform Management Interface (IPMI) command and the power capping message is sent to the baseboard management controller of the associated hardware resource via an Intelligent Platform Management Interface. In another option, the power capping command is a Common Information Model command.

The processor or CPU 34 of the composed system, or perhaps the management server 20, may monitor a level of a performance metric for the workload instance being executed by the composed system. The CPU 34 or management server 20 that monitors the performance metric for the workload instance may also identify a service level agreement for the workload instance. The service level agreement may include a minimum level of the performance metric that the composed system must provide to support the workload instance. When a power cap is imposed on the composed system, the CPU 34 or management server 20 may impose separate power caps on the various hardware resources of the composed system and may adjust one or more of the power caps to an extent that still allows the composed system to perform the workload instance with sufficient performance metrics that at least satisfy the service level agreement.

Figure 2:
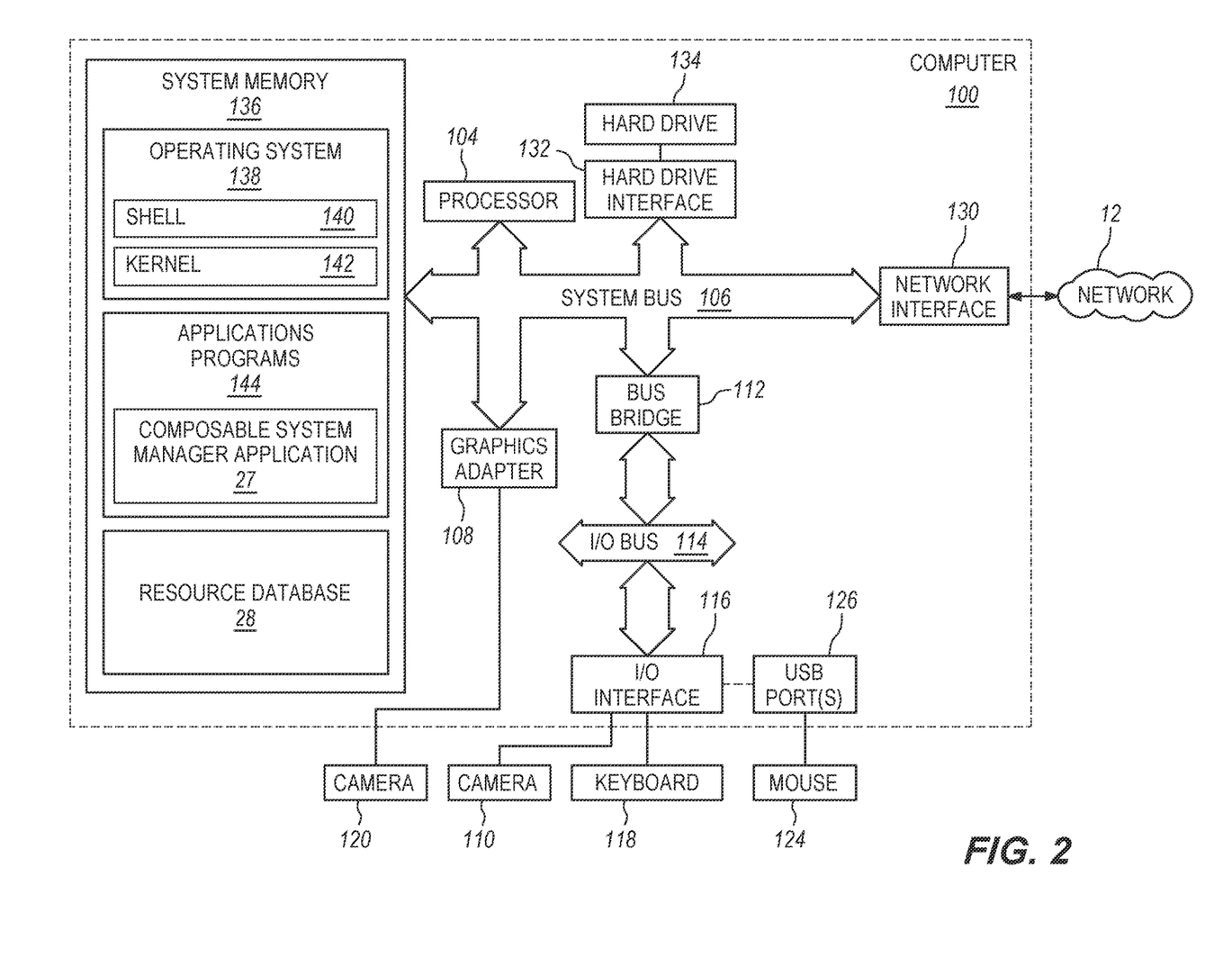
FIG. 2 is a diagram of a computer.

FIG. 2 is a diagram of a computer 100 that may be representative of the management server 20 of FIG. 1 for performing various operations in accordance with some embodiments. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other system resources over the network 12 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions for the composable computing system management ("composer") application 27 that causes the processor 104 to perform the operations according to one or more embodiments. The system memory 136 may further include the system hardware resource database 28.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Figure 3A:
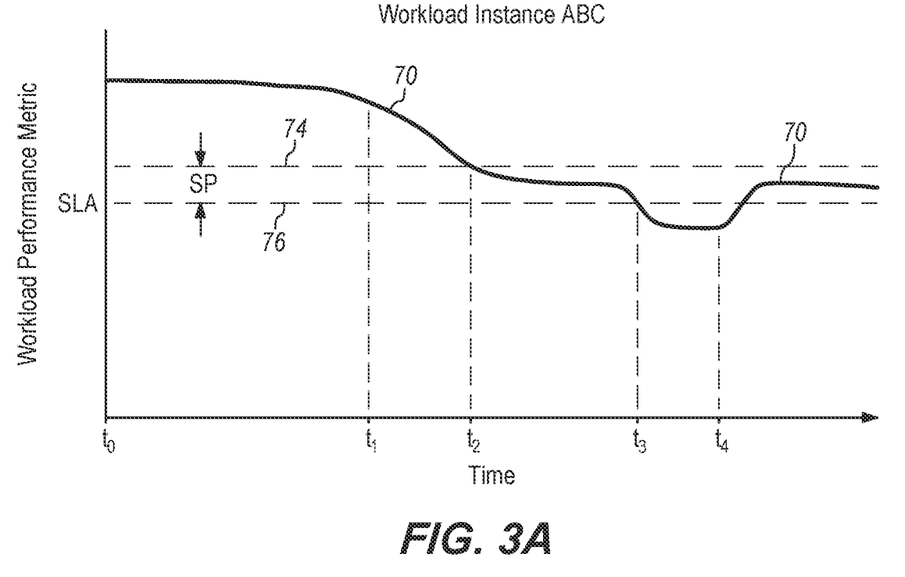
FIG. 3A is a graph illustrating a workload performance metric as a function of time for a hypothetical workload instance ABC.

FIG. 3A is a graph illustrating a workload performance metric as a function of time for a hypothetical workload instance ABC. A line 70 represents the value of the workload performance metric (see vertical axis), such as latency, availability and/or throughput, for the workload instance ABC as a function of time (see horizontal axis). The value of the workload performance metric may be affected by the nature or load of the workload instance ABC as well as the value or level of a power cap that may be placed on one or more of the hardware resources of a composed system that is performing the workload instance ABC.

Figure 3B:
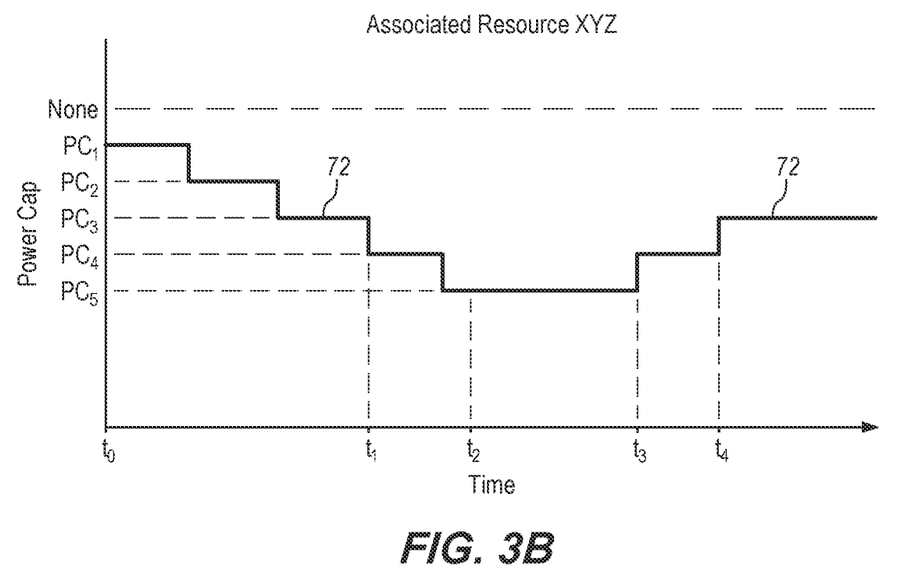
FIG. 3B is a graph illustrating power capping as a function of time for a hypothetical associated resource XYZ on a composed system running the workload instance ABC.

FIG. 3B is a graph illustrating a line 72 represents a value or level of a power cap (see vertical axis) that may be imposed on a hypothetical associated resource XYZ on the composed system running the workload instance ABC as a function of time (see horizontal axis). The time scale on the horizontal axis of FIGS. 3A and 3B are intended to be the same time scale, such that a change in the power cap value imposed on the associated resource XYZ as shown in FIG. 3B can be seen to affect the workload performance metric of the workload instance ABC as shown in FIG. 3A. Accordingly, FIGS. 3A and 3B will be described together.

During an initial period of time from $t_0$ to $t_1$, a compute resource of a composed system that is performing workload instance ABC may impose a power cap on the associated resource XYZ because the monitored value of the workload performance metric 70 is greater than a setpoint amount 74 above the minimum level of the performance metric established by the service level agreement (SLA) 76 for the workload instance. Since the monitored value of the workload performance metric 70 has not significantly declined during this initial period of time, the compute resource incrementally reduces the power cap (i.e., less power is allocated to the associated resource XYZ) by three steps from $PC_1$ to $PC_3$.

During a second period of time from $t_1$ to $t_2$, the compute resource imposed two additional incremental reductions in the value of the power cap, including $PC_4$ and $PC_5$. As a result of the further reductions in the power cap power cap 72, the workload performance metric 70 declined to a value less than the setpoint amount 74 above the minimum level of the performance metric established by the service level agreement (SLA) 76 for the workload instance. So, during the period of time between $t_2$ and $t_3$, no more reductions in the power cap 72 are made and the value of the workload performance metric 70 remains above the minimum level 76.

At time $t_3$, some hypothetical increase in the load on the associated resource XYZ causes the value of the workload performance metric 70 to drop below the minimum level 76. The compute resource, which monitors the value of the workload performance metric 70, detects this drop below the minimum level 76 and responds by incrementally increasing the value of the associated hardware resource power cap 72 on the associated resource XYZ. After a first increase in the power cap 72 at time $t_3$, a second increase in the power cap 72 at time $t_4$ is successful in causing the value of the workload performance metric 70 to rise back above the minimum level of the performance metric established by the service level agreement (SLA) 76 for the workload instance.

Embodiments may impose this type of dynamic and incremental power capping of one or more associated resources allocated to a composed system where each associated resource is accessible over a network in a composable computing system. For example, a CPU allocated to the composed system in one of the compute servers may send a power capping command to the baseboard management controller of the server that includes the associated resource(s). The baseboard management controller of the server then imposes the power cap on the associated resource, such as a memory module, a disk drive and/or a graphic processing unit. The compute resource continues to monitor the workload performance metric and may change the power cap on any one or more associated hardware resources allocated to the composed system as described.

Figure 4:
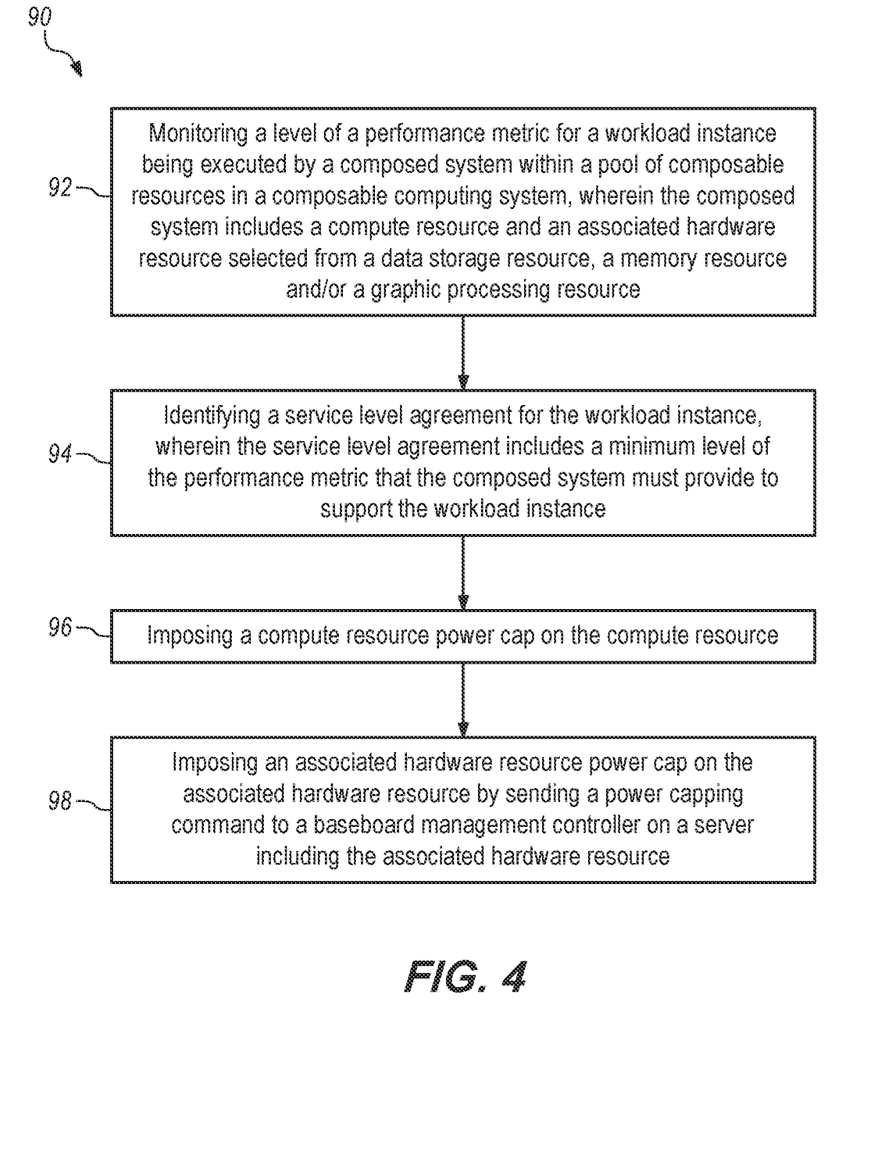
FIG. 4 is a flowchart of a method according to one embodiment.

FIG. 4 is a flowchart of operations 90 according to one embodiment. Operation 92 includes monitoring a level of a performance metric for a workload instance being executed by a composed system within a pool of composable resources in a composable computing system, wherein the composed system includes a compute resource and an associated hardware resource selected from a data storage resource, a memory resource and/or a graphic processing resource. Operation 94 includes identifying a service level agreement for the workload instance, wherein the service level agreement includes a minimum level of the performance metric that the composed system must provide to support the workload instance. Operation 96 includes imposing a compute resource power cap on the compute resource. Operation 98 includes imposing an associated hardware resource power cap on the associated hardware resource by sending a power capping command to a baseboard management controller on a server including the associated hardware resource.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium with program instructions embodied therein, the program instructions being configured to be executable by a processor to cause the processor to perform operations comprising:
   monitoring a level of a performance metric for a workload instance being executed by a composed system within a pool of composable resources in a composable computing system, wherein the composed system includes a compute resource and an associated hardware resource selected from a data storage resource, a memory resource and/or a graphic processing resource;
   identifying a service level agreement for the workload instance, wherein the service level agreement includes a minimum level of the performance metric that the composed system must provide to support the workload instance;
   imposing a compute resource power cap on the compute resource; and
   imposing an associated hardware resource power cap on the associated hardware resource by sending a power capping command to a baseboard management controller on a server including the associated hardware resource.

2. The computer program product of claim 1, the operations further comprising:
   incrementally reducing the associated hardware resource power cap on the associated hardware resource in response to the monitored level of the performance metric being greater than a setpoint amount above the minimum level of the performance metric established by the service level agreement for the workload instance.

3. The computer program product of claim 2, further comprising:
   incrementally increasing the associated hardware resource power cap on the associated hardware resource in response to the monitored level of the performance metric being less than the minimum level of the performance metric established by the service level agreement for the workload instance.

4. The computer program product of claim 1, the operations further comprising:
   incrementally reducing the associated hardware resource power cap on the associated hardware resource until the monitored level of the performance metric is less than a setpoint amount above the minimum level of the performance metric established by the service level agreement for the workload instance.

5. The computer program product of claim 4, wherein the associated hardware resource power cap is incrementally reduced by a fixed amount of power.

6. The computer program product of claim 4, wherein the operation of incrementally reducing the associated hardware resource power cap on the associated hardware resource includes sending a further associated hardware resource power capping command to the baseboard management controller of the associated hardware resource.

7. The computer program product of claim 4, further comprising:
   incrementally increasing the associated hardware resource power cap on the associated hardware resource until the monitored level of the performance metric is greater than the minimum level of the performance metric established by the service level agreement for the workload instance.

8. The computer program product of claim 1, wherein the associated hardware resource power cap limits the associated hardware resource to a setpoint amount of power.

9. The computer program product of claim 1, wherein the associated hardware resource power cap identifies a power state for operation of the associated hardware resource.

10. The computer program product of claim 1, wherein the power capping command is an Intelligent Platform Management Interface command and the power capping command is sent to the baseboard management controller of the associated hardware resource via an Intelligent Platform Management Interface.

11. The computer program product of claim 1, wherein the power capping command is a Common Information Model command.

12. The computer program product of claim 1, further comprising:
   identifying an excess capacity of the associated hardware resource that is temporarily unusable under the associated hardware resource power cap imposed on the associated hardware resource; and
   temporarily releasing the identified excess capacity of the associated hardware resource from the composed system back to the composable computing system resource pool.

13. The computer program product of claim 12, further comprising:
   determining that the associated hardware resource power cap on the associated hardware resource of the composed node has been eliminated or increased; and
   requesting return of the temporarily released excess capacity of the associated hardware resource to the composed system.

14. The computer program product of claim 1, further comprising:
   determining a level of the associated hardware resource power cap using a machine learning algorithm.

15. The computer program product of claim 14, wherein the machine learning algorithm is a Reinforcement Learning algorithm.

16. A computer program product comprising a non-transitory computer readable medium with program instructions embodied therein, the program instructions being configured to be executable by a processor to cause the processor to perform operations comprising:
   monitoring a level of a performance metric for a workload instance being executed by a composed system within a pool of composable resources in a composable computing system, wherein the composed system includes a compute resource and a plurality of associated hardware resources selected from a data storage resource, a memory resource and/or a graphic processing resource;
   identifying a service level agreement for the workload instance, wherein the service level agreement includes a minimum level of the performance metric that the composed system must provide to support the workload instance;
   imposing a compute resource power cap on the compute resource; and
   imposing, for each of the plurality of associated hardware resources, an associated hardware resource power cap on the associated hardware resource by sending a power capping command to a baseboard management controller on a server including the associated hardware resource.

17. The computer program product of claim 16, the operations further comprising:
   incrementally reducing, for each of the plurality of associated hardware resources, the associated hardware resource power cap on the associated hardware resource in response to the monitored level of the performance metric being greater than a setpoint amount above the minimum level of the performance metric established by the service level agreement for the workload instance.

18. The computer program product of claim 16, the operations further comprising:
   incrementally reducing, for each of the plurality of associated hardware resources, the associated hardware resource power cap on the associated hardware resource until the monitored level of the performance metric is less than a setpoint amount above the minimum level of the performance metric established by the service level agreement for the workload instance.

19. The computer program product of claim 18, wherein the associated hardware resource power cap on a first one of the plurality of associated hardware resources is incrementally reduced until the monitored level of the performance metric is less than a setpoint amount above the minimum level of the performance metric established by the service level agreement for the workload instance prior to incrementally reducing the associated hardware resource power cap on a second one of the plurality of associated hardware resources until the monitored level of the performance metric is less than a setpoint amount above the minimum level of the performance metric established by the service level agreement for the workload instance.

20. The computer program product of claim 18, further comprising:
   incrementally increasing, for each of the plurality of associated hardware resources, the associated hardware resource power cap on the associated hardware resource until the monitored level of the performance metric is greater than the minimum level of the performance metric established by the service level agreement for the workload instance.

* * * * *